United States Patent [19]

Kawamura

[11] 4,419,112
[45] Dec. 6, 1983

[54] AIR CLEANER

[75] Inventor: Yoshio Kawamura, Kakogawa, Japan

[73] Assignee: Kawasaki Jukogyo Kabushiki Kaisha, Japan

[21] Appl. No.: 409,891

[22] Filed: Aug. 20, 1982

[30] Foreign Application Priority Data

Aug. 26, 1981 [JP] Japan .................. 56-126893[U]

[51] Int. Cl.³ .............................................. B01D 46/00
[52] U.S. Cl. ........................................ 55/480; 55/493; 55/504
[58] Field of Search ................ 55/480, 481, 478, 493, 55/504

[56] References Cited

U.S. PATENT DOCUMENTS

| 2,068,048 | 1/1937 | Adams | 55/480 X |
| 2,439,596 | 4/1948 | Crosby | 55/480 X |
| 2,962,121 | 11/1960 | Wilber | 55/480 |
| 3,745,753 | 7/1973 | Risse | 55/481 |
| 3,928,008 | 12/1975 | Petersen | 55/493 X |
| 4,365,541 | 12/1982 | Marques et al. | 55/481 X |

FOREIGN PATENT DOCUMENTS

| 1027175 | 5/1953 | France | 55/493 |
| 55-66654 | 5/1980 | Japan | 55/481 |

Primary Examiner—Kathleen J. Prunner
Attorney, Agent, or Firm—Leydig, Voit, Osann, Mayer and Holt, Ltd.

[57] ABSTRACT

An air cleaner suitable for use with motor-bicycles particularly suitable for off-road travelling including an air cleaner element held between a fixed wall of a cleaner casing and an element holder plate mounted in the cleaner casing. The element holder plate is removably mounted in the casing and it is tiltable in the casing so that when the casing is closed by a lid, the element holder plate can be moved from a position in which it facilitates insertion of the air cleaner element to a position in which it positively holds same between it and the fixed wall. The air cleaner mounting structure of the aforesaid construction has the effects of enabling the air cleaner element to be readily and positively mounted and removed and allowing cleaning of the interior of the cleaner casing to be readily effected.

1 Claim, 5 Drawing Figures

AIR CLEANER

FIELD OF THE INVENTION

This invention relates to an air cleaner provided with an improved mounting structure for a cleaner element.

DESCRIPTION OF THE PRIOR ART

In motorcycles, particularly dual purpose motorcycles mainly used for off-road travels, off-road motorcycles or three-wheelers it often happens that they draw a greater volume of mud or muddy water into their cleaners than ordinary street type motorcycles. Thus the former require maintenance and repair a greater number of times than the latter, and it has hitherto been customary to use a cleaner element formed of urethane (sponge) which can be readily cleaned.

Figure 5:
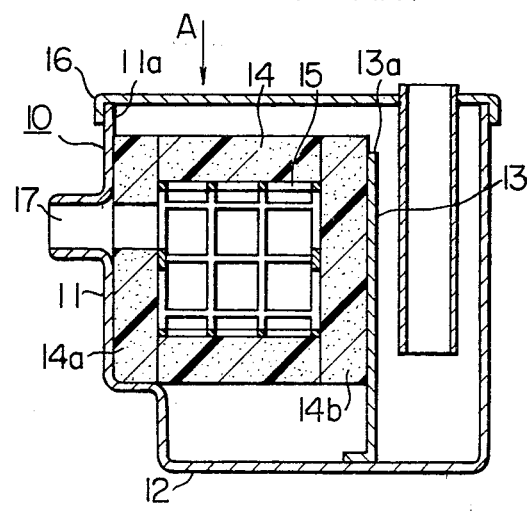
FIG. 5 is a vertical sectional side view of an air cleaner of the prior art.

FIG. 5 shows an air cleaner of the prior art using an air cleaner element formed of urethane. In the figure, a cleaner body 10 of iron has a holder plate 13 joined by welding to a bottom 12 thereof in a position opposed to one fixed wall 11 thereof. An air cleaner element 14 formed of urethane is attached to an outer side of a cage-shaped frame 15 in the form of a cylinder having opposite end faces. The air cleaner element 14 has an axial free length which is set at a value slightly greater than the distance between the fixed wall 11 and the holder plate 13. Stated differently, the air cleaner element 14 is forced in the direction of an arrow A between the fixed wall 11 and the holder plate 13 by utilizing its flexibility and held therebetween while being axially compressed. A lid 16 is removed when the cleaner element 14 is mounted in the air cleaner 10 or removed therefrom.

In the air cleaner having the mounting structure of the aforesaid construction for the air cleaner element 14, disadvantages have hitherto been experienced. Since the cleaner element 14 of a large free length is forced between the fixed wall 11 and the holder plate 13, opposite end portions 14a and 14b of the air cleaner element 14 would catch against upper end portions 11a and 13a of the fixed wall and holder plate 13 respectively and might peel off or might suffer deformation to obturate an air port 17 leading to the carburetor, or the cleaner body 10 and the element 14 could not be sealed satisfactorily, thereby causing deleterious influences to be exerted on engine performance. To avoid these troubles, it has hitherto been necessary to carry out mounting of the air cleaner element with meticulous care to thereby make a cleaner element mounting operation a time-consuming one. An additional disadvantage has been that since the holder plate 13 is affixed to the inner central portion of the cleaner body 10, cleaning of the cleaner body 10 itself has also been a time-consuming operation.

SUMMARY OF THE INVENTION

This invention has been developed for the purpose of obviating the aforesaid disadvantages of the prior art. Accordingly the invention has as its object the provision of an air cleaner having an improved mounting structure for an cleaner element capable, when the air cleaner element is held between the fixed wall of the air cleaner body and the holder plate opposed to the fixed wall, of readily, positively and smoothly mounting the air cleaner element between the fixed wall and the holder plate without any inordinate deformation thereof or damage thereto and at the same time permitting the interior of the air cleaner body to be readily cleaned without any trouble.

The aforesaid object can be accomplished according to the invention by mounting the holder plate in the air filter body in a manner to be tiltable from a position in which it holds the air cleaner element to a position in which it releases the air cleaner element and by providing the lid for closing the element inserting opening of the air cleaner body with a pressing portion for forcing the holder plate against the cleaner element to hold the latter between the fixed plate and the holder plate when the element inserting opening is closed by the lid.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

DESCRIPTION OF THE PREFERRED EMBODIMENT

Figure 1:
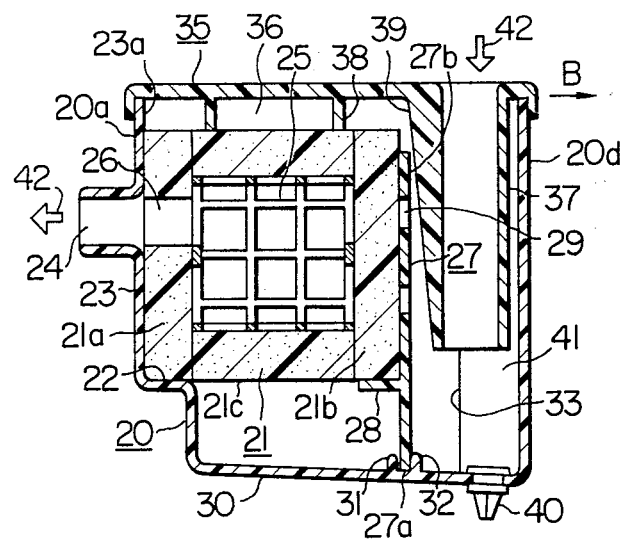
FIG. 1 is a vertical sectional side view of one embodiment of the air cleaner of the invention.
Figure 2:
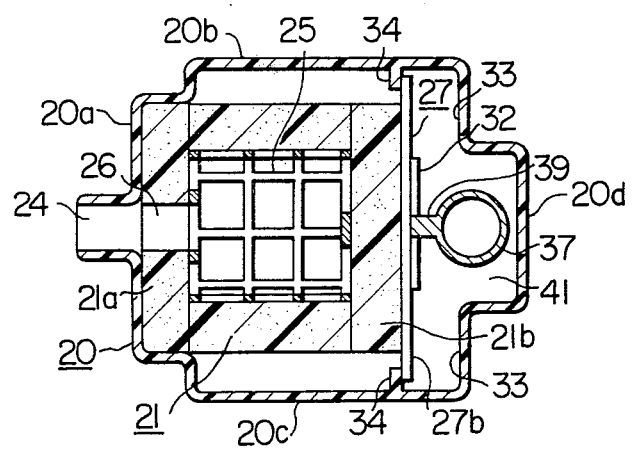
FIG. 2 is a transverse sectional view of the air cleaner shown in FIG. 1.

Referring to FIGS. 1 and 2, a cleaner body 20 formed of a synthetic resinous material is formed at its front surface 20a with a recess 22 for supporting a lower portion of one end portion 21a of a cylindrical air cleaner element 21, a fixed wall 23 against which the one end portion 21a axially abuts and an air port 24 formed in the fixed wall 23 and communicating with a carburetor, not shown. The air cleaner element 21 which is formed of urethane in the form of a sponge is attached to a frame 25 of a cage shape in a manner to surround the latter in its entirety and has one end portion 21a which is formed with a ventilating aperture 26 communicating with the air port 24 formed in the fixed wall 23.

Figure 3:
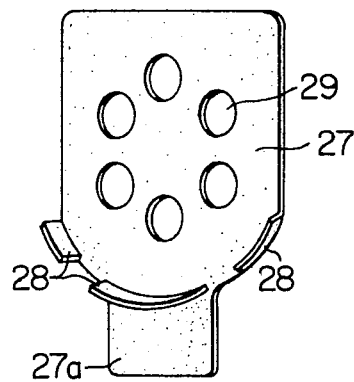
FIG. 3 is a perspective view of the holder plate of the air cleaner.

A holder plate 27 formed of a synthetic resinous material arranged in the air cleaner body 20 is located in juxtaposed relation to the inner surface of the fixed wall 23 and holds the axially oriented air cleaner element 21 between the fixed wall 23 and the holder plate 27 by pressing against the other end portion 21b of the air cleaner element 21. As shown in FIG. 3, the holder plate 27 comprises a support piece 28 for supporting a lower half portion of the other end portion 21b of the air cleaner element, and a plurality of ventilating apertures 29 for partially opening an end face of the other end portion 21b. The holder plate 27 also has a base 27a which is detachably inserted between projections 31 and 32 formed on a bottom 30 of the cleaner body 20 shown in FIG. 1 in a manner to be tiltable. As shown in FIG. 2, the air cleaner body 20 is formed on its left and right sides 20b and 20c with a stopper 33 for regulating the degree of tilting of the holder plate 27 in the direction of an arrow B and a stopper 34 for regulating the degree of tilting thereof in a direction opposite to the direction of the arrow B respectively.

Referring to FIG. 1 again, the air cleaner body 20 has an aperture at its top or an element inserting opening 36 which is closed by a lid 35 formed of a synthetic resinous material formed with a suction pipe 37 inserted between a rear surface 20d of the air cleaner body 20 and the holder plate 27, and a holddown member 38 for preventing upward movement of the air cleaner element 21. The suction pipe 37 is formed at its outer side with a tapering pressing portion 39 in the form of a rib-like projection which is adapted to force an upper end portion 27b of the holder plate 27 against the air cleaner element 21.

The air cleaner body 20 is formed at its bottom 30 with a drain 40 formed of rubber which is located close to the rear surface 20d. The drain 40 includes an inverted conical portion projecting downwardly from the bottom 30 which is split into two portions to allow the drain 40 to open when a liquid collected on the bottom 30 should be discharged but prevent muddy water or the like from entering into the air cleaner body 20 by closing the drain 40. The bottom 30 is inclined with respect to the horizontal in such a manner that it is located in progressively lower positions in going from its front surface 20a toward its rear surface 20d, to facilitate discharging of the liquid collected in the air cleaner body 20 through the drain 40. Also, as shown in FIG. 3, the base 27a of the holder plate 27 is cut out at both sides to facilitate flow of muddy water or the like that might be directed across the holder plate 27.

Figure 4:
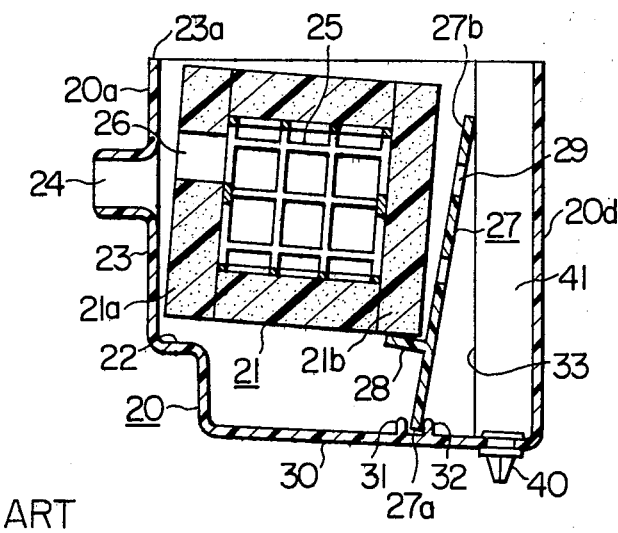
FIG. 4 is a view showing the process steps of assembling the air cleaner.

In the air cleaner of the aforesaid construction, when the air cleaner element 21 is fitted in the cleaner body 20, the holder plate 27 is tilting rearwardly and the element inserting opening between the fixed wall 23 and the holder plate 27 or the opening between the upper end portions 23a and 27b of the fixed wall 23 and the holder plate 27 respectively is increased in dimension, as shown in FIG. 4. At this time, the upper end portion 27b of the holder plate 27 abuts against the stopper 33 (see FIG. 2) to keep the holder plate 27 at a predetermined tilting angle. As the cleaner element 21 is inserted into the cleaner body 20 from above, the cleaner element 21 is supported at its lower half portions of both ends by the recess 22 in the cleaner body 20 and the support piece 28 of the holder plate 27, and at the same time the holder plate 27 is brought to an upright position from the tilting position. Then the lid 35 shown in FIG. 1 is attached to the cleaner body 20, to close the element inserting opening 36 and at the same time to allow the suction pipe 37 to be smoothly inserted into a gap 41 between the holder plate 27 and the rear surface 20d of the cleaner body 20 by utilizing the tapering. At this time, the pressing portion 39 formed in the suction pipe 37 urges the upper end portion 27b of the holder plate 27 toward the front surface 20a until it abuts against the stopper 34 (see FIG. 2), to hold the air cleaner element 21 between the fixed wall 23 and the holder plate 27 and to keep the air cleaner element 21 from moving upwardly by the hold down member 38 formed at the lid 35. In place of the pressing portion 39 in the form of a rib-like projection formed in the suction pipe 37, the suction pipe 37 itself may be formed tapering.

When the aforesaid mounting structure for the air cleaner element 21 is used, the holder plate 27 is brought to a tilting position to increase the dimension of the element inserting opening between the fixed wall 23 and the holder plate 27 as the air cleaner element 21 is held therebetween. This eliminates the risks that the opposite end portions 21a and 21b of the cleaner element 21 might catch against the upper end portion 23a of the fixed wall 23 and the upper end portion 27b of the holder plate 27 and be inordinately deformed or damaged. Thus fitting of the air cleaner element 21 between the fixed wall 23 and the holder plate 27 can take place readily, positively and smoothly. The arrangement whereby the holder plate 27 is detachably supported by the projections 31 and 32 holding the base 27a of the holder plate 27 makes it possible to readily clean the interior of the cleaner body 20 by removing the holder plate 27 therefrom.

In the aforesaid structure, air 42 flows through the suction pipe 37 into a gap 41 shown in FIG. 1 and then into the end portion 21b of the air cleaner element 21 through the ventilating apertures 29 in the holder plate 27 or into the interior of the element 21 through its outer peripheral portion 21c, until it flows through the air port 24 in the air cleaner body 20 toward the carburetor.

While a preferred embodiment of the invention has been described using specific terms, such description is for illustrative purposes only, and it is to be understood that changes and variations may be made without departing from the spirit or scope of the following claims.

What is claimed is:

1. An air cleaner comprising:
   an air cleaner body having an inlet and an outlet;
   a fixed wall formed by said air cleaner body and having said outlet formed therein;
   a holder plate mounted in said air cleaner body;
   an air cleaner element removably held between said fixed wall and said holder plate between said inlet and said outlet;
   an element inserting opening formed in said air cleaner body; and
   a lid for covering said element inserting opening to close same; wherein the improvement resides in that:
   said holder plate is removably mounted in said air cleaner body in a manner to be tiltable from a position in which it cooperates with the fixed wall to hold the air cleaner element therebetween to a position in which it releases the air cleaner element from holding engagement therewith, and that
   said lid for said element inserting opening is formed with a pressing portion disposed to press said holder plate against said air cleaner element to hold the air cleaner element between it and the fixed wall when said element inserting opening is closed by said lid.

* * * * *